US012300162B2

(12) United States Patent
Bouchene

(10) Patent No.: US 12,300,162 B2
(45) Date of Patent: May 13, 2025

(54) METHOD OF DETERMINING A STATE OF A DISPLAY

(71) Applicant: STMicroelectronics (Grenoble 2) SAS, Grenoble (FR)

(72) Inventor: Salim Bouchene, Seyssinet-Pariset (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 0 days.

(21) Appl. No.: 18/537,252

(22) Filed: Dec. 12, 2023

(65) Prior Publication Data

US 2024/0203334 A1 Jun. 20, 2024

(30) Foreign Application Priority Data

Dec. 14, 2022 (FR) ........................................ 2213341

(51) Int. Cl.
*G09G 3/20* (2006.01)
*G09G 3/3208* (2016.01)

(52) U.S. Cl.
CPC ......... *G09G 3/3208* (2013.01); *G09G 3/2014* (2013.01); *G09G 2310/08* (2013.01); *G09G 2320/0626* (2013.01); *G09G 2320/064* (2013.01); *G09G 2320/08* (2013.01); *G09G 2330/021* (2013.01); *G09G 2330/027* (2013.01); *G09G 2360/144* (2013.01); *G09G 2360/16* (2013.01)

(58) Field of Classification Search
CPC ............. G09G 3/3208; G09G 2310/08; G09G 2320/064; G09G 2330/021; G09G 2330/027; G09G 2360/144; G09G 2320/0285; G09G 2320/08; G09G 2360/145; G09G 2360/16; G09G 3/2014; G09G 2320/0626
See application file for complete search history.

(56) References Cited

U.S. PATENT DOCUMENTS 9,622,326 B1 * 4/2017 Devyver .............. G09G 3/3406
9,881,554 B2 * 1/2018 Meng .................... G09G 3/3258
11,580,901 B2 * 2/2023 Cogan .................. G09G 3/3406
2022/0254843 A1 * 8/2022 Barel ...................... H10K 59/40

FOREIGN PATENT DOCUMENTS

WO 2020074696 A1 4/2020

OTHER PUBLICATIONS

INPI Search Report and Written Opinion for priority application, FR Appl. No. 2213341, report dated Jun. 14, 2014, 14 pgs.

* cited by examiner

*Primary Examiner* — Douglas M Wilson
(74) *Attorney, Agent, or Firm* — Crowe & Dunlevy LLC

(57) ABSTRACT

A display includes a display panel and a circuit. The circuit controls the display panel according to at least one control mode such as a pulse width modulation control mode. A method for determining a state of the display includes: acquiring samples from a channel of an ambient light sensor disposed below the display panel; supplying the samples to a processing circuit; detecting, by the processing circuit and based on said samples, whether the display panel is controlled in pulse width modulation; and following detecting the pulse width modulation control mode, calculating by the processing circuit a duty cycle from the samples.

16 Claims, 3 Drawing Sheets

METHOD OF DETERMINING A STATE OF A DISPLAY

PRIORITY CLAIM

This application claims the priority benefit of French Application for Patent No. 2213341, filed on Dec. 14, 2022, the content of which is hereby incorporated by reference in its entirety to the maximum extent allowable by law.

TECHNICAL FIELD

The present disclosure generally relates to electronic circuits and, in particular, to electronic devices comprising a display and an ambient light sensor disposed below the display.

BACKGROUND

Devices comprising each a display (i.e., an assembly of a display panel and of a control circuit of the display panel) and an ambient light sensor disposed below the display panel (i.e., facing a rear face of the panel display opposite to a front face of the display panel on which are displayed the images displayed by the display) are known.

In each of these known devices, the display constitutes a black box for the other circuits of the device, for example for a circuit comprising a microcontroller and a control circuit of the display. Thus, when a control is delivered to the display by the control circuit of the display, for example following a request from the microprocessor to this control circuit to adjust the brightness transmitted by the display, there is no output signal of the display that should allow the state of the display to be determined (i.e., the way the control circuit of the display panel effectively controls the display panel following the control received by the display, and particularly how the portion of the display disposed above and facing the ambient light sensor is effectively controlled).

However, not knowing the state of the display cause issues in implementing various applications of the device. For example, as a measurement of the ambient light is requested to the ambient light sensor, the ambient light received by the sensor is low due to its mitigation when this light passed through the display panel before reaching the pixels of the sensor, and further when the display panel transmits light, a part of this transmitted light is received by the sensor and perturbs the measurement of the ambient light. The knowledge of the control mode of the display panel by the control circuit of the display panel would allow the result of the measurement of the ambient light to be corrected and/or the one or more time periods during which the sensor integrates the light it receives to be adjusted, in order to obtain a more accurate result of the measurement of the ambient light.

There is a need to address all or some of the drawbacks of the known electronic devices comprising a display including a display panel and an ambient light sensor disposed below the display panel.

For example, there is a need in these known devices for a method of determining the state of the display.

There is a need to address all or some of the drawbacks of the known electronic devices comprising a display including a display panel and an ambient light sensor disposed below the display panel.

SUMMARY

One embodiment provides a method of determining a state of the display comprising a display panel and a control circuit of the display panel, wherein the control circuit of the display panel controls the display panel according to at least one control mode, said at least one control mode comprising a pulse width modulation control mode, and wherein the method comprises: 1) acquiring a plurality of samples of at least one channel of an ambient light sensor disposed below the display panel during a first acquisition phase; 2) delivering the samples to a processing circuit; 3) detecting, via the processing circuit and based on said samples, whether the display panel is controlled according to the pulse width modulation control mode; and 4) following detecting the pulse width modulation control mode, calculating by the processing circuit a duty cycle of the pulse width modulation from said samples.

According to an embodiment: the method further comprises, for each image displayed by the display, emitting a synchronization signal from the display and receiving the synchronization signal by a first circuit; and in step 1), the first circuit triggers the first acquisition phase synchronously with the synchronization signal.

According to an embodiment, a maximum period of the synchronization signal is previously known and the duration of the first acquisition phase is shorter than this maximum period of the synchronization signal.

According to an embodiment, the period of the pulse width modulation control mode is previously known and determines the duration of the first acquisition phase.

According to an embodiment, a frequency for acquiring the samples during the first acquisition phase is at least in part determined by a maximum duty cycle of the pulse width modulation control mode and the period of the pulse width modulation, this maximum duty cycle and this period of the pulse width modulation being constant and previously known.

According to an embodiment, step 4) comprises, following detecting the pulse width modulation control mode, determining by the first circuit and from said samples, a difference between the intensity of the light received from said at least one channel as the display panel receives a pulse and is switched-on, and the intensity of the light received by said at least one channel as the display panel is switched-off.

According to an embodiment, said at least one control mode further comprises a DC control mode comprising for each control period in DC control mode, a start-up duration during which the display panel is switched-off, the step 3) further comprises detecting, by the first circuit and based on said samples, whether the display panel is controlled according to a DC control mode, and the step 4) comprises, following detecting the DC control mode, determining by the first circuit and from said samples, a difference between the intensity of the light received by said at least one channel as the display channel is switched-on, and the intensity of the light received by said at least one channel as the display channel is switched-off.

According to an embodiment, in step 3), detecting the DC control mode comprises detecting by the first circuit and from said samples, the start-up duration.

According to an embodiment, the acquisition frequency of the samples during the first acquisition phase is at least in part determined by the start-up duration.

According to an embodiment, said at least one control mode further comprises an OFF control mode during which the display panel is kept switched-off, and the method further comprises a step of detecting whether the display panel is controlled according to the OFF control mode.

According to an embodiment, no synchronization signal is emitted during the OFF control mode, and detecting that the control mode of the display panel is the OFF control mode comprises detecting that no synchronization signal is emitted during a duration longer than a period of the synchronization signal.

According to an embodiment, the steps 1), 2), 3), and 4) are implemented for each channel of the ambient light sensor.

According to an embodiment, the processing circuit forms a part of the ambient light sensor.

According to an embodiment, the step 4) further comprises determining by the processing circuit and from said samples, a luminance level emitted by said at least one channel.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the usual applications, e.g., a measurement of the ambient light, requiring a knowledge of a state of a display for their implementations have not been detailed, the described embodiments being suitable for these usual applications.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms “front”, “back”, “top”, “bottom”, “left”, “right”, etc., or to relative positional qualifiers, such as the terms “above”, “below”, “higher”, “lower”, etc., or to qualifiers of orientation, such as “horizontal”, “vertical”, etc., reference is made to the orientation shown in the figures as orientated during normal use.

Unless specified otherwise, the expressions “around”, “approximately”, “substantially” and “in the order of” signify within 10%, and preferably within 5%.

Figure 1:
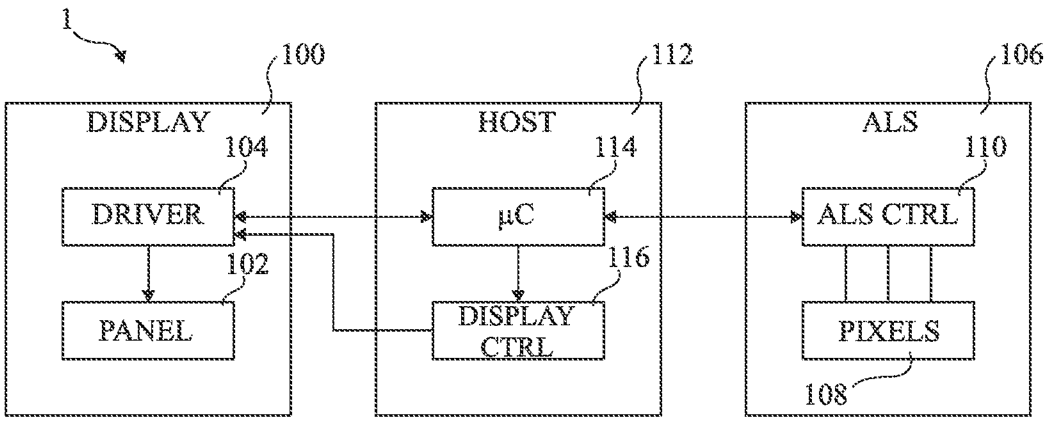
FIG. 1 schematically illustrates in block form an electronic device of the type.

FIG. 1 schematically illustrates in block form an example embodiment of an electronic device 1.

The device 1 comprises a display 100 (block “DISPLAY”). The display comprises a display panel 102, preferably an Organic Light Emitting Diode (OLED) display panel (block “PANEL”). The display panel 102 is controlled by a circuit 104 (block “DRIVER”) of the display 100. In other words, the circuit 104 is a control circuit of the display panel 102.

The device 1 further comprises an ambient light sensor 106 (block “ALS”). The sensor 106 comprises a plurality of pixels in order to receive light, this plurality of pixels being represented with a block 108 (“PIXELS”) in FIG. 1. The sensor 106 further comprises a control circuit 110 (block “ALS CTRL”) of the pixels of the sensor 106.

Circuit 110 allows the pixels 108 of the sensor 106 to be controlled, for example, such that the beginning and the termination of each acquisition phase during which an amount of light received by the pixels of the sensor 106 is measured are controlled.

Circuit 110 further allows the output signals of the pixels 108 to be received, for example signals representative of, or determined by, a photocurrent generated by each pixel.

Sensor 106 comprises at least one measurement channel, and mode preferably several measurement channels corresponding to several respective wavelength ranges. Sensor 106 is configured to, during an ambient light measurement, measure the light received in each measurement channel.

Thus, in each measurement channel, the pixels of the channel provide an output signal to the circuit 110 corresponding to a signal representative of the intensity of the light received in the wavelength range of the channel by the pixels of the channel. For example, each channel delivers an output signal corresponding to the sum of the photocurrents of the pixels of the channel. For example, the sensor 106 comprises three channels respectively including ranges of wavelengths corresponding to red light, to green light, and to blue light.

The circuit 110 is configured to sample at an acquiring frequency Fa, the output signal of each channel of the sensor. Particularly, the circuit 110 comprises one or more analog-to-digital converters (not illustrated in FIG. 1) configured, for each channel, to sample the output signal of the channel at frequency Fa, and to convert each sample into a digital word corresponding to the value of this sample. For example, the circuit 110 comprises one analog-to-digital converter per channel.

During a phase for measuring the ambient light comprising one or more acquisition phases, the device 1 is configured to integrate the output signal of each channel over the whole duration of the measurement phase (i.e., over the duration of the totality of the acquisition phases of this phase for measuring the ambient light). As an example, for each channel, this integration is implemented on the digital samples obtained from the output signal of the channel.

Although it is not shown in FIG. 1, in the device 1, the sensor 106, more precisely the pixels 108 of the sensor 106, are disposed below the display panel 102. Thus, the light received by the pixels 108 is mitigated as compared to the ambient light, due to the fact this light has first passed through the display panel 102 before reaching the pixels 108 of the sensor 106. Additionally, during a phase for measuring the ambient light comprising one or more acquisition phase, according to the start time and the duration of each acquisition phase, this phase for acquiring the ambient light may be at least in part implemented as the display panel emits light. Yet, when the display panel emits light, a part of the emitted light is directed (for example by refraction) towards the sensor 106 and overlaps the ambient light received by the sensor 106, which reduces the signal to noise ratio and perturbs the measurement of the ambient light.

The device further comprises a processing and control circuit 112 (block "HOST"). Circuit 112 comprises a microprocessor 114 (block "μC") allowing data, for example received from sensor 106, to be processed, and control signals to be delivered, for example towards the display 100 and/or the sensor 106.

The circuit 112, for example its microprocessor 114, is configured to launch measurements of the ambient light by the sensor 106. For example, for each measurement phase, the circuit 112 controls a start time of each measurement phase and/or a number of acquisition phases for the measurement phase and/or a start time of each acquisition phase and/or a duration of each acquisition phase.

According to an embodiment, the circuit 112, for example its microprocessor 114, is configured to receive the samples delivered by the sensor 106. For example, for each ambient light measurement phase, the circuit 112, for example its microprocessor 114, determines a result of the ambient light measurement, for example the result of the ambient light measurement in each channel of the sensor 106, by integrating for each channel the samples corresponding over the duration of the totality of the acquisition phases of the ambient light measurement phase.

Alternatively, the circuit 112 receives only the result of the measurement of the ambient light, for example the result of the measurement of the ambient light in each channel of the sensor 106, determining the result of the measurement of the ambient light by the sensor 106 from the samples of the output signals of the channels of the sensor 106 being directly implemented in the sensor 106, for example in the circuit 110.

The circuit 112 comprises a display control circuit 116 (block "DISPLAY CTRL"). The circuit 116 is configured to receive control signals from the microprocessor 114, and to deliver corresponding control signals to the display 100, for example to the circuit 104 of the display 100.

As an example, a control signal sent by the circuit 112 to the circuit 104 determines a set point of brightness for the display panel 102, and the circuit 104 is then configured to adjust the control (or the state) of the display panel according to this set point.

Further, the circuit 112, for example its circuit 116, is configured to deliver to the display 100, for example to the circuit 104, the data corresponding to each image the display 100 displays via its display panel 102.

According to an embodiment, as it will be detailed hereafter, in order to avoid the display issues resulting from a difference in operating frequencies between the circuit 112 and the display 100, the display 100, for example its circuit 104, is configured to deliver a synchronization signal Vsync to the circuit 112, for example to the circuit 114. The signal Vsync, for example called vertical synchronization signal, is configured to indicate to the circuit 112, for example to the processor 114, that a new image can be displayed by the display, which triggers the sending by the circuit 112 to the display 100 of the data corresponding to this new image to be displayed.

As already previously noted in relation with the disclosure of the known devices including a display and an ambient light sensor disposed below the display, in the device 1, the display 100 is a black box. In other words, except the possible signal Vsync, the display 100 delivers no output signal allowing the state of the display, that is the manner the circuit 104 controls the display panel 102, to be determined.

For example, when the circuit 104 is configured to control the display panel 102 in pulse width modulation, no output signal of the display 100 allows the duty cycle of the pulse width modulation to be known, especially when the duty cycle changes following a change of the brightness set point sent to the display 100. Yet the knowledge of the duty cycle in addition to the signal Vsync would allow, when a measurement of ambient light is implemented by the sensor 106, the start time and the duration of each phase of acquisition of the ambient light measurement phase to be adjusted, so that this duration corresponds to the duration between two consecutive pulses of the control of the display in pulse width modulation, and that each acquisition phase is fully performed during a corresponding time period. It would allow each acquisition phase to be as long as possible for a given duty cycle, so that the signal to noise ratio is increased.

Thus, a method of determining the state of the display 100 is provided. This method comprises acquiring samples by the sensor 106, and from these samples, determining the state of the display. Particularly, when the circuit 104 controls the display panel 102 according to a pulse width modulation control mode, the method comprises a step of detecting that the display panel 102 is controlled in pulse width modulation control mode, and following such a detection, a step of determining the duty cycle of the pulse width modulation. These steps of detecting a control mode and the characteristics of the detected control mode are implemented from acquired samples, by a processing circuit. The processing circuit forms a part of the sensor 106, for example of the circuit 110. As an alternative example, this processing circuit forms a part of the circuit 112, and corresponds to the microprocessor 114. Example embodiments of this method are now described in relation with FIGS. 2 to 6.

Figure 2:
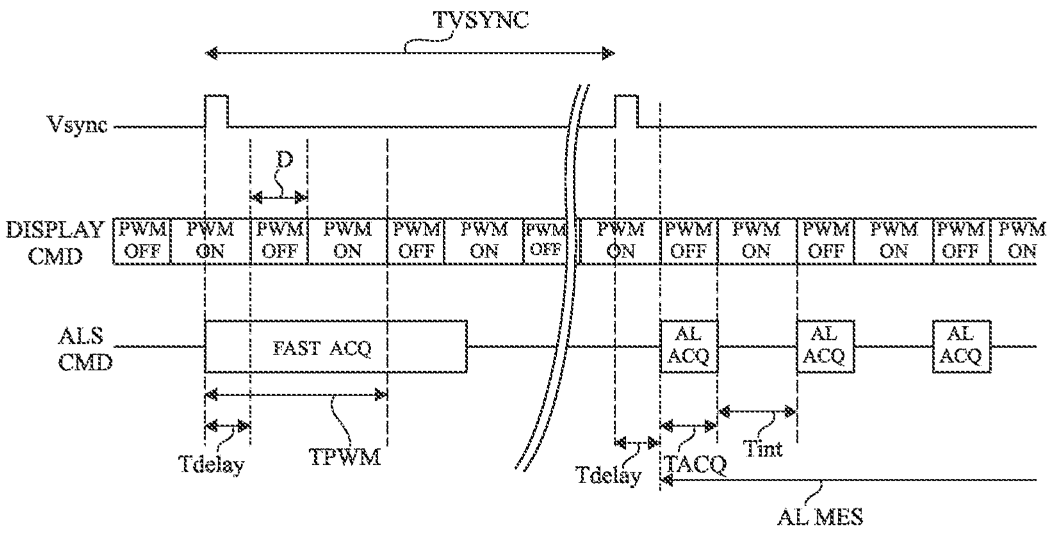
FIG. 2 illustrates with time diagrams a control mode of a display panel of a display, and steps of a method of determining a state of the display.

FIG. 2 represents with time diagrams a control mode of the display panel 102 of the display 100 and steps according to an embodiment of a method of determining a state of the display 100. The figure illustrates the evolution of the signal Vsync, previously described, the control of the display 102 by the circuit 104 ("DISPLAY CMD" in FIG. 2) and the operation of the sensor 106 ("ALS CMD" in FIG. 2). In the example of FIG. 2, the control mode of the panel 102 by the circuit 104 is a pulse width modulation control mode, while in practice the circuits of the device 1 other than the display 100 do not have the prior knowledge of the control mode of the display panel 102.

As represented in the example of FIG. 2, the control DISPLAY CMD of the panel display 102 is periodic with a time period TVSYNC corresponding to the time period of the signal Vsync.

Further, in a pulse width modulation control mode, as in the case of FIG. 2, each period of the signal Vsync comprises a plurality of pulses (PWM ON in FIG. 2) during each of which the display panel 102 emits light, two consecutive pulses PWM ON being spaced by one period PWM OFF during which the display panel 102 emits no light. The pulses PWM ON are supplied to the display panel at a frequency FPWM=1/TPWM, where TPWM is the period of the pulse width modulation. The duty cycle of the pulse width modulation is equal to the ratio of the duration of each pulse PWM ON to the duration of each period PWM OFF.

According to one embodiment, the period TPWM is constant, previously known, and corresponds to an operation characteristic of the display 100. This value of the period TPWM is, for example, supplied by the manufacturer of the display 100.

According to an embodiment, a maximum value of the duty cycle of the pulse width modulation is previously known and corresponds to a characteristic of the display 100, for example supplied by the manufacturer of the display.

A first step of the method consists in a first acquisition FAST ACQ of samples by the sensor 106, for example for at least one channel of the sensor 106, preferably for each channel of the sensor 106. For example, the phase FAST ACQ comprises, for at least one channel, and preferably for each channel, obtaining an output photocurrent of the channel and analog-to-digital converting this output signal at the acquisition frequency Fa, the samples constituting the result of this analog-to-digital converting.

As an example, the frequency Fa has a value different, preferably higher, than that of the frequency Fa during the one or more acquisition phases of an ambient light measurement phase. As an alternative example, the frequency Fa has the same value during the one or more acquisition phases of an ambient light measurement phase and during the phase FAST ACQ.

According to an embodiment, the duration of the acquisition FAST ACQ is higher than the period TPWM so that capturing at least one period TPWM of the pulse width modulation control mode.

According to an embodiment, a maximum value of the period TVSYNC of the signal Vsync is previously known and the duration of the acquisition FAST ACQ is lower than this maximum value of the period TVSYNC. As an example, the period TVSYNC is constant, and the maximum value of the period TVSYNC is equal to the constant value of the period TVSYNC. As an alternative example, the period TVSYNC can be changed during the operation of the device 1, and the maximum value of the period TVSYNC corresponds to the highest value the period TVSYNC may have.

According to an embodiment, the maximum value of the duty cycle of the pulse width modulation corresponds to a minimum value of each duration PWM OFF, and the acquisition frequency Fa of the samples is at least in part determined by this maximum value of the duty cycle. Indeed, to be able to obtain at least one sample during each duration PWM OFF of the phase FAST ACQ, the frequency Fa has to be higher than or equal to twice 1/D, where D is the duration of a phase PWM OFF for the maximum value of the duty cycle. Further, to be able to measure with a sufficient accuracy the duration of each phase PWM OFF captured during the phase FAST ACQ, the frequency Fa is selected, for example, to be higher than 10 times 1/D, preferably than 100 times 1/D.

In practice, for a given location of the sensor 106, and more particularly of its pixels 108, below the panel 102 of the display 100, it is possible to determine either empirically, or mathematically, a duration Tdelay between the start of each signal Vsync, or in other words of each pulse of the signal Vsync, and the start, for the pixels of the display panel 102 that are disposed above the sensor 106, of the first period PWM OFF following this pulse of the signal Vsync. This duration Tdelay is constant for a given location of the sensor 106 below the panel 102, and changes when the location of the sensor 106 below the panel 102 is modified, for example between two devices 1.

In the example embodiment of FIG. 2, the start of the phase FAST ACQ of the method is synchronized with the signal Vsync, for example starts with the signal Vsync. In another not-represented example, the phase FAST ACQ starts at the end of the period Tdelay.

Synchronizing the phase FAST ACQ with the signal Vsync previously knowing the period TPWM allows the minimum duration that the phase FAST ACQ should have to capture at least one full period TPWM to be reduced. It allows, for example, the duration of the phase FAST ACQ, and thus the duration of the implementation of the method, to be reduced, especially because a reduction of the duration of the phase FAST ACQ causes a reduction of the number of samples acquired during this phase, and thus a reduction of the processing time of these samples.

When the method of determining the state of the display 100 is implemented and allows, following an acquisition FAST ACQ of samples by the sensor 106, and based on these samples, detecting that the display panel is controlled in pulse width modulation, the sample-processing circuit, for example the microprocessor 114 or the circuit 110, determines, still based on these samples, a value of the duty cycle of the pulse width modulation.

For example, according to an embodiment, the processing circuit determines from these samples the duration of the phases PWM OFF and that of the phases PWM ON, and calculates the duty cycle from these durations. As an alternative example, the processing circuit determines only the duration of the phases PWM OFF from the samples, and calculates the duty cycle from this duration and from the previously known period TPWM.

As an example, once the implementation of the method allowed detecting that the panel 102 is controlled in pulse width modulation, the duration of the phases PWM OFF and the duty cycle of this modulation, during a next phase ALS MES of measurement of the ambient light comprising several acquisition phases AL ACQ, the start of each phase AL ACQ can be synchronized with the start of the corresponding duration PWM OFF using the signal Vsync, the duration Tdelay previously known, and the duty cycle determined by the implementation of the method, and the duration TACQ of each phase AL ACQ can further be selected equal to or substantially lower than the duration PWM OFF. For example, the first phase AL ACQ of the measurement AL MES starts at the end of the duration Tdelay elapsed since a pulse Vsync, and the end of each phase AL ACQ is spaced from the start of the next phase AL ACQ by a duration Tint equal to TPWM-TACQ. This allows the signal to noise ratio to be increased as compared to a case where each phase AL ACQ would be in whole or in part implemented during a phase PWM ON, or as compared to a case where each phase AL ACQ would be entirely implemented during a corresponding phase PWM OFF but would have a duration equal to the minimum duration of the phases PWM OFF (i.e., the duration of the phases PWM OFF corresponding to the maximum value of the duty cycle).

Although the phase AL MES is not entirely illustrated in FIG. 2, at the end of this phase, the amount of light received during the totality of the phases AL ACQ of the phase AL MES, for example in at least one channel of a sensor 106, preferably in each channel of the sensor 106, is obtained in the form of one or more output signals of the sensor. As an example, each output signal of a channel of the sensor 106 corresponds to the totality of the numeral samples obtained during each phase AL ACQ from the output photocurrent of the channel.

At the end of the phase AL MES, the output signals of the channels of the sensor 106 are processed, for example by the sensor 106 directly or by the circuit 112, so that a result of the measurement of the ambient light is obtained.

The result of the measurement of the ambient light allows the device 1, for example the microprocessor 114, to control a change of the brightness of the display panel 102 to adjust to the measured ambient light brightness conditions and/or to the determined ambient light type (outdoor light, light from a phosphorescent tube, light from a filament bulb), the ambient light type being determined, for example, from the relative amounts of light between the channels of the sensor 106 during the phase AL MES.

Figure 3:
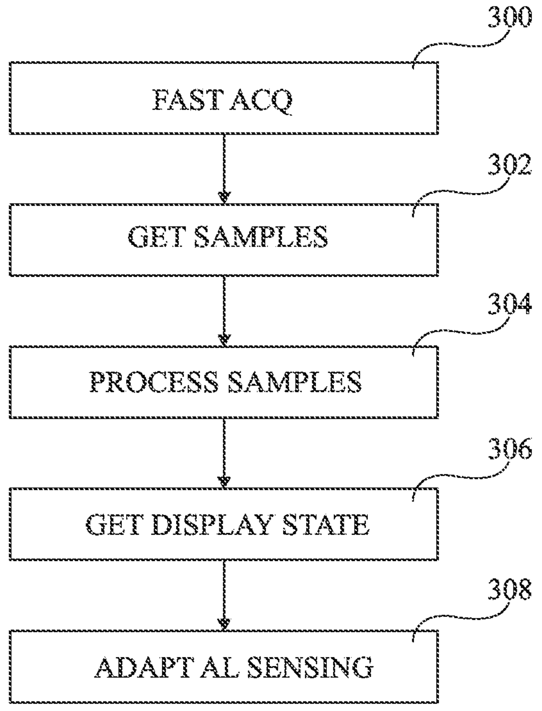
FIG. 3 illustrates with a flow-chart a method of determining a state of the display.

FIG. 3 illustrates with a flow-chart an embodiment of the method of determining a state of the display 100. The method is implemented in the example of FIG. 3, in the device 1 of FIG. 1.

In a step 300 (block "FAST ACQ") corresponding to the first acquisition FAST ACQ described in relation with FIG. 2, an acquisition phase is implemented by the sensor 106, during which the sensor 106 generates samples of the output signal of at least one channel of the sensor 106, preferably an output signal of each channel of the sensor 106.

In a next step 302 (block "GET SAMPLES"), the samples obtained at the end of step 300 are supplied to a processing circuit, for example a processing circuit being a part of the sensor 106 or a processing circuit being a part of the circuit 112, for example the microprocessor 114.

In a next step 304 (block "PROCESS SAMPLES"), the processing circuit processes the samples to detect which one is the control mode of the display panel 102. According to an embodiment, the display panel 102 is configured to be controlled by the circuit 104 at least according to a pulse width modulation control mode and the processing circuit is configured to detect whether the panel 102 is controlled in pulse width modulation.

Always in step 304, if the processing circuit detects that the display panel 102 is controlled in pulse width modulation, the processing circuit determines, still based on the samples, a duty cycle of the pulse width modulation, preferably by previously determining the duration of the phases PWM OFF from the samples.

In a next step 306 (block "GET DISPLAY STATE"), a state of the display is determined. For example, in the case where the processing circuit of the samples detects in step 304 that the panel 102 is controlled in pulse width modulation and calculates the duty cycle of this modulation, the state of the display comprises the indication of this control mode, of the duty cycle thereof, and for example of the duration of the phases PWM OFF. As an example, the state of the display is supplied to the circuit 112, for example to the microprocessor 114 of the circuit 112, or to the sensor 106, for example to the circuit 110 of the sensor 106.

In an optional next step 308 ("ADAPT AL SENSING"), the parameters of a next phase AL MES of measurement of the ambient light by the sensor 106 are adjusted according to the state of the display. For example, the parameters TACQ, Tint, and the synchronization of the phase AL MES with the signal Vsync are adjusted when the display is controlled in pulse width modulation based on the value of the duty cycle of this modulation. However, in other embodiments, the state of the display determined at the end of the step 306 can be used to implement steps other than step 308, for example to allow, during a measurement of the indirect time of flight by an indirect-time-of-flight sensor, emitting a laser beam used for this measurement of time of flight to be implemented during a phase PWM OFF of the pulse width modulation.

Figure 4:
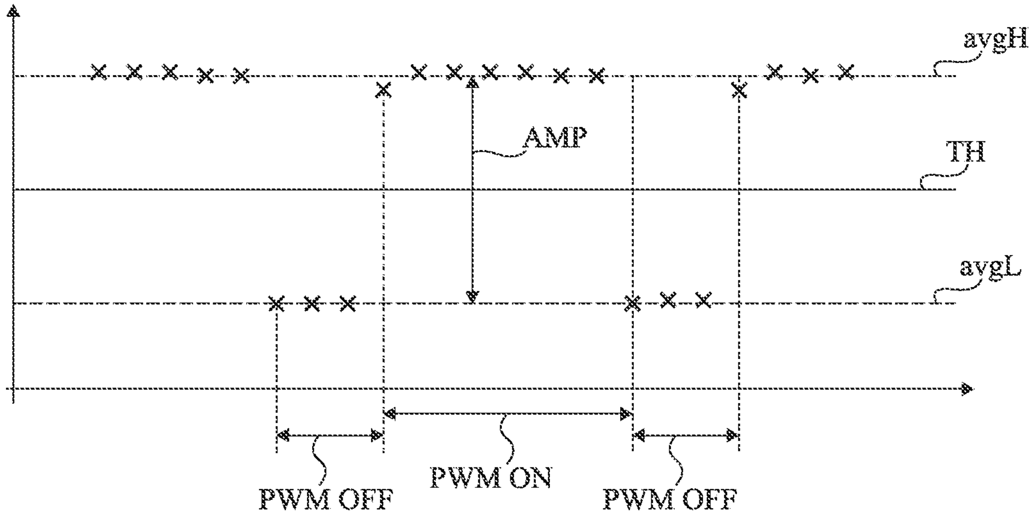
FIG. 4 illustrates with time diagrams details of a step of the method.

FIG. 4 illustrates with time diagrams details of an embodiment of a step of the method previously described. More particularly, FIG. 4 illustrates details of an embodiment of the step 304 of the method for a channel of the sensor 106, on the understanding that this step 104 can be implemented for each channel of the sensor 106 for which the samples were obtained at the end of the step 302. In FIG. 4, the samples of the channel obtained by the processing circuit at the end of the step 302 for a channel of the sensor 106 are shown over the time (x-axis), the value of each sample being represented on the y-axis. In FIG. 4, the samples were acquired during a phase FAST ACQ implemented as the panel 102 is controlled in pulse width modulation.

The step 304 comprises ordering the samples of the channel as compared to a threshold TH.

As an example, the threshold TH is previously determined empirically.

As an alternative example, the phase 304 comprises determining the threshold TH from the samples. For example, among the samples received for the channel, a given number of samples having the highest values is used to calculate a high value H (not illustrated in FIG. 3) corresponding to the average value of these samples of the highest value, and similarly, a same given number of samples having the highest values is used to calculate a low value L (not illustrated in FIG. 3) corresponding to the average value of these samples of the highest value, and the threshold TH is then equal to (H+L)/2.

Ordering the samples compared to a threshold TH allows determining the samples having a value higher than the threshold TH that are considered as corresponding to times at which the panel 102 emits light, that is samples acquired during a period PWM ON in a pulse width modulation control mode, and the samples having a value less than the threshold TH that are considered as corresponding to times at which the panel 102 emits no light, that is samples acquired during a period PWM OFF in a pulse width modulation control mode.

Thus, it is possible to determine the duration of the phases during which the panel 102 emits no light (i.e., the duration of the phases PWM OFF when the panel 102 is controlled in pulse width modulation). For example, for each group of consecutive samples having values less than the threshold TH, is calculated the duration being equal to the number of samples of the group multiplied by the acquisition period of the samples equal to 1/Fa, and the determined value of the duration of the phases PWM OFF is then equal to an average value of this calculated durations. Similarly, it is possible to determine a value of the duration of the phases PWM ON from the group of consecutive samples having values higher than the threshold.

Preferably, when the step 304 is implemented for several channels of the sensor 106, a value of the duration of the phases PWM OFF is determined for each channel and the value of the duration of the phases PWM OFF determined in step 304 corresponds to the average of the values of the durations of the phases PWM OFF determined for these channels. This allows a more accurate value of the duration of the phases PWM OFF to be obtained. Similarly, a value of the phases PWM ON may correspond to the average of the values of the durations of the phases PWM ON determined for these channels.

From the determined duration of the phases PWM OFF and from the prior knowledge of the period TPWM and/or from the determined duration of the phases PWM ON, a value of the duty cycle is calculated in step 304.

When the circuit 104 controls the panel 102 in pulse width modulation, the determination of the state of the display 100 further optionally comprises for each channel for which the step 304 is implemented, determining the magnitude of the pulses PWM ON, or in other words, the difference AMP between the intensity of the light received by the channel during the pulses PWM ON corresponding to phases during which the panel 102 emits light and the intensity of the light received during phases PWM OFF corresponding to phases during which the panel 102 emits no light.

As an example, to determine the difference AMP of a channel, an average value avgH of the samples of the channel having values higher than the threshold TH of the channel is calculated, an average value avgL of the channel having values less than the threshold TH of the channel is calculated, and the difference AMP is then equal to avgH minus avgL.

This step of calculation of the magnitude AMP for each channel of the sensor 106 for which the step 304 is implemented, for example in the pulse width modulation control mode, once the maximum value of the duty cycle reached. For example, when the duration of the phases PWM OFF is equal to D, the magnitude of the pulses PWM ON applied to the panel 102 by the circuit 104 can be changed, for example increased, by the circuit 104 in order to change, for example to increase, the intensity of the light emitted by the display 100. In this case, the state of the display is in part determined by the difference AMP calculated for each channel for which the step 304 is implemented.

Hereinabove, in relation with FIGS. 1-4, there has been described the case where the circuit 104 controls the panel 102 in pulse width modulation, with or without variable magnitude of these pulses PWM ON. According to an embodiment, the method also allows detecting when the circuit 104 controls the panel 102 according to an OFF control mode, according to which the panel 102 is kept switched-off by the circuit 104.

According to an embodiment, this detection that the panel 102 is controlled according to the OFF control mode is implemented by detecting a lack of signal Vsync (i.e., a lack of pulses Vsync), over a duration higher than the period TVSYNC of pulses Vsync, for example over a duration higher than the maximum value of the period TVSYNC when this maximum value is previously known.

Hereinabove, in relation with FIGS. 1-4, there is described the case where the circuit 104 controls the panel 102 according to at least one control mode comprising a pulse width modulation control mode, for example with or without variable magnitude of these pulses PWM ON, and for example an OFF control mode. According to an embodiment, the method also allows detecting when the circuit 104 controls the panel 102 according to a DC control mode, as will be described in relation with FIGS. 5 and 6. Indeed, although there are devices 1 in which the panel 102 is selectively controlled, for example, in OFF mode or only in pulse width modulation mode, there are also devices 1 in which the panel 102 is selectively controlled, for example, in OFF mode or in pulse width modulation mode or in DC mode, and the method has then to be capable of detecting the control mode of the panel 102.

Figure 5:
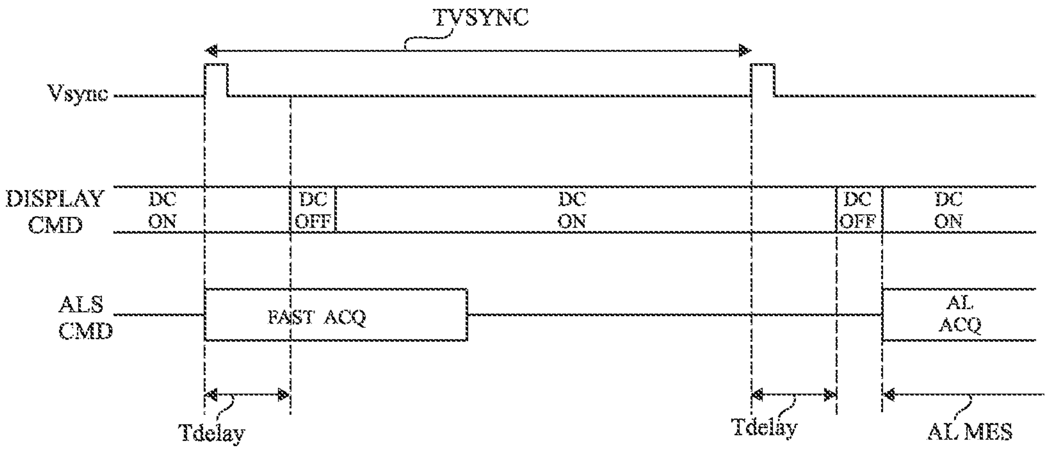
FIG. 5 illustrates with time diagrams another control mode of the display panel of the display and steps of an embodiment of the method of determining a state of the display.

FIG. 5 illustrates with time diagrams, a control mode of the display panel 102 of the display 100 and steps of an embodiment of a method of determining a state of the display 100. FIG. 5 illustrates the evolution of the signal Vsync previously described, the control DISPLAY CMD of the display 102 by the circuit 104 and the operation ALS CMD of the sensor 106. In the example of FIG. 5, the control mode of the panel 102 by the circuit 104 is a DC control mode, although practically the circuits of the device 1 other than the display 100 do not have prior knowledge of the control mode of the display panel 102.

As represented in the example of FIG. 5 and as it was already noted in relation with FIG. 2, the control DISPLAY CMD of the display panel 102 is periodic having a period TVSYNC corresponding to the period of the signal Vsync.

In a DC control mode, as shown in FIG. 5, for each period TVSYNC, the circuit 104 delivers to the display 102 a control signal DISPLAY CMD constant over the whole period TVSYNC, except a short start-up duration DC OFF during which the control circuit 104 controls the panel 102 so that it emits no light. In DC control mode, two consecutive phases DC OFF are thus spaced from each other by a phase DC ON during which the panel 102 is switched-on.

This period DC OFF is required, for example, for a correct operation of the pixels of the panel 102, and corresponds in each pixel of the panel 102 to a start-up of a capacitance of the pixel.

The duration of the periods DC OFF is preferably constant and previously known. For example, the duration of the periods DC OFF is set by the manufacturer of the display 100.

In some embodiments, the duration of each period DC OFF is less than the minimum duration D of the phases PWM OFF when the duty cycle of the pulse width modulation is maximum. In such embodiments, in an embodiment wherein the panel 102 is selectively controlled according at least to the DC mode and the pulse width modulation mode, the sample acquisition frequency Fa during the phase FAST AQC is at least in part determined by the duration of the phases DC OFF of the DC control mode. Indeed, to be able to obtain at least one sample during each duration DC OFF of the phase FAST ACQ, the frequency Fa has to be higher than or equal to twice the opposite of the duration DC OFF. Further, to be able to measure with a sufficient accuracy the duration of a phase DC OFF captured during the phase FAST ACQ, the frequency Fa is for example selected higher than ten times the opposite of the duration DC OFF, preferably than hundred times the opposite of the duration DC OFF.

Practically, the duration DC OFF is synchronized with the signal Vsync, and for the pixels of the panel 102 disposed above the sensor 106, each duration DC OFF starts at the end of the period Tdelay having started upon a corresponding pulse Vsync.

The method comprises as previously described in relation with FIGS. 2 and 3, a step FAST ACQ (step 300 in FIG. 3) of acquisition of samples by the sensor 106, for example for at least one channel of the sensor 106, preferably for each channel of the sensor 106. This step FAST ACQ is the same as that previously described. The samples acquired during the phase FAST ACQ are then supplied to the processing circuit (step 302 in FIG. 3), and the processing circuit detects, from the samples, whether the panel 102 is controlled in DC mode, or whether the panel is controlled in pulse width modulation mode (step 304 in FIG. 3).

In the example embodiment of FIG. 5, the start of the phase FAST ACQ of the method is synchronized with the signal Vsync, for example starting with the signal Vsync. In another non-represented example, each phase FAST ACQ is synchronized with the signal Vsync and starts at the end of a corresponding period Tdelay. Thus, by providing that the duration of the phase FAST ACQ is at least equal to that of a period TPWM (not illustrated in FIG. 5, see FIG. 2), it is guaranteed that a whole duration DC OFF is captured during the phase FAST ACQ.

As an example, when the duration of the phase FAST ACQ is at least equal to twice the period TPWM, detecting that the control mode of the panel 102 is the DC mode consists in detecting that there is a single period during which the panel 102 is switched-off over the whole duration of the phase FAST ACQ.

As an alternative example, when the duration of the phases DC OFF is constant and less than the minimum duration D of the periods PWM OFF, detecting that the control mode of the panel 102 is the DC mode comprises detecting (step 304 in FIG. 3), over the duration of the phase FAST ACQ and from the samples, a phase during which the panel 102 is switched-off, and that the duration of this phase wherein the panel 102 is switched-off, is less than the duration D. Indeed, this indicates that the duration during which the panel 102 is switched-off is a duration DC OFF of the DC control mode, and not a duration PWM OFF of the pulse width modulation control mode. In this alternative example, when the phase FAST ACQ is synchronized on the signal Vsync so that the phase FAST ACQ comprises a phase DC OFF when the panel 102 is controlled in DC mode, the duration of the phase FAST ACQ can be reduced as much as possible to the constant duration of a period TPWM.

When the method of determining the state of the display 100 is implemented and allows, following the sample acquisition FAST ACQ by the sensor 106, and on the basis of these samples, detecting that the display panel is DC-controlled, the circuit of processing the samples further determines, for at least one channel, and preferably for each channel, a difference between the intensity of the light received by said at least one channel when the display panel is switched-off (phase DC OFF) and the intensity of the light received by said at least one channel when the display panel is switched-on (phase DC ON).

As an example, once the implementation of the method allowed detecting that the panel 102 is DC-controlled, and, for at least one channel, preferably for each channel, a difference in the received light intensity between the phase DC ON and the phase DC OFF, during a next phase ALS MES of measurement of the ambient light, one or more acquisition phases AL ACQ, preferably a single phase AL ACQ, are implemented during a corresponding phase DC ON. Although the phase AL MES is not fully illustrated in FIG. 2, at the end of this phase AL MES, the value of the obtained samples can then be corrected, preferably in each channel for which the step 304 has been implemented, by subtracting to these samples the value of the intensity difference calculated for this channel in step 304. This comes to correct the result of the measurement of the ambient light by subtracting the noise resulting from the emitting of light by the display 100.

Figure 6:
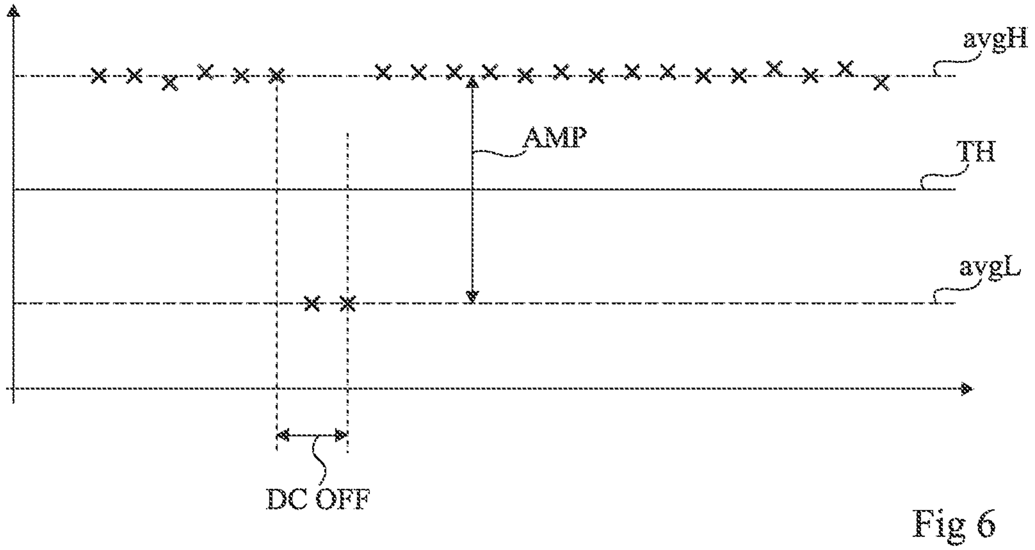
FIG. 6 illustrates with time diagrams details of a step of the method.

FIG. 6 illustrates with time diagrams details of an embodiment of a step of the method previously described. More particularly, FIG. 6 illustrates the details of an embodiment of the step 304 of the method for one channel of the sensor 106, on the understanding that this step 104 can be implemented for each channel of the sensor 106 for which the samples have been obtained at the end of the phase 302. In FIG. 6, the samples of the channel obtained by the processing circuit at the end of the step 302 for one channel of the sensor 106 are illustrated over the time (x-axis), the value of each sample being illustrated on the y-axis. In FIG. 6, the samples have been acquired during a period FAST ACQ implemented as the panel 102 is DC-controlled.

The step 304 (FIG. 3) comprises the ordering of the samples of the channel compared to the threshold TH.

As an example, the threshold TH is previously empirically determined as it has already been indicated in relation with FIG. 4.

As an alternative example, the phase 304 comprises determining the threshold TH, for example from the samples. For example, among the samples received for the channel, a given number of samples having the highest values is used to calculate a high value H (not illustrated in FIG. 6) corresponding to the average value of these samples of highest value, and similarly, a same given number of samples having the highest values is used to calculate a low value L (not illustrated in FIG. 6) corresponding to the average value of these samples of highest value and the threshold TH is then equal to (H+L)/2. Preferably, the given number of samples used to calculate the values H and L, thus the threshold TH, is less than or equal to the number of samples acquirable at the frequency Fa over a duration DC OFF, so that the samples having the lowest values correspond only to the samples acquired during a period DC OFF when the panel 102 is DC-controlled as is the case in FIG. 6.

Ordering samples compared to the threshold TH allows determining the samples having a value higher to the threshold TH that are considered as corresponding to times at which the panel 102 emits light, i.e. samples acquired during a period DC ON in a DC control mode, and the samples having a value lower to the threshold TH that are considered as corresponding to times at which the panel 102 emits no light (i.e., samples acquired during a period DC OFF in a DC control mode).

Thus, it is possible to determine the duration of the phases during which the panel 102 emits no light (i.e., the duration of a phase DC OFF when the panel is DC-controlled). For example, for each group of consecutive samples having values less than the threshold TH, there is calculated the duration equal to the number of samples of the group multiplied by the period of sample acquisition equal to 1/Fa, and the value determined of the duration of the phases during which the panel emits no light is then equal to the average value of these calculated durations. Similarly, it is possible to determine a value of the duration of the phases during which the panel 102 emits light from groups of consecutive samples having values higher than the threshold.

Preferably, when the step 304 is implemented for several channels of the sensor 106, a value of the duration of the phases during which the panel 102 emits no light being determined for each channel and the value of the duration of the phases during which the panel emits no light being determined in step 304 corresponds to the average of the values of the durations determined for these channels. This allows for obtaining a more accurate value of the duration of the phases during which the panel emits no light. Similarly, a value of the duration of the phases during which the panel 102 emits light may correspond to the average of the values of the duration of the phases during which the panel 102 emits no light that were determined for these channels.

When the panel 102 is controlled according to a control mode selected among the pulse width modulation control mode and the DC control mode, the step 304 comprises detecting that of the above two modes being currently used to control the panel 102.

As an example, when the phase FAST ACQ has a duration higher than twice TPWM, such detecting comprises counting the number of groups of consecutive samples being above the threshold TH (i.e., the number of the phase during which the panel 102 emits no light during the duration of the phase FAST ACQ). If this number is equal to 1, that means the control mode is the DC control mode. If this number is higher than 1, that means the control mode is the pulse width modulation control mode.

As an alternative example, in an embodiment wherein the duration of the phases DC OFF is shorter than the duration D of the phases PWM OFF when the duty cycle of the pulse width modulation is maximum, once the duration of the one or more phases during which the panel 102 emits no light has been determined as above indicated, detecting the control mode of the display 102 comprises the comparison of this determined duration with the duration D. If the determined duration is higher than or equal to the duration D, that means that the panel 102 is controlled in pulse width modulation, and the previously determined duration corresponds to the duration of the phases PWM OFF. However, if this determined duration is lower than the duration D, that means that the panel 102 is DC-controlled, and the previously determined duration corresponds to the duration of the phases DC OFF.

When in step 304, it is detected that the panel 102 is DC-controlled, determining the state of the display 100 further comprises, for each channel for which the step 304 is implemented, determining the magnitude of the control DC ON, or in other words, the difference AMP between the intensity of the light received by the channel during a phase DC ON and the intensity of the light received during a phase DC OFF. This step of determining the difference AMP for a channel from the samples acquired for this channel is implemented in the same way as in FIG. 4, for example by determining the values avgH and avgL and by calculating the difference AMP equal to avgH minus avgL.

The embodiments described above show that the panel 102 is controlled according to a control mode selected among at least one control mode, for example among at least the pulse width modulation control mode, or for example among the pulse width modulation control mode and the DC control mode.

The previously described embodiments and alternative embodiments concern the phase FAST ACQ being synchronized with the signal Vsync. In alternative embodiments, in addition to the vertical synchronization signal Vsync comprising a pulse Vsync per displayed image, the display 100, for example its circuit 104, delivers a signal Hsync of further synchronization comprising a synchronization pulse Hsync per displayed image line and the phase FAST ACQ is further synchronized with the signal Hsync. This signal Hsync is referred to as a horizontal synchronization signal.

In yet further alternative embodiments, the phase FAST ACQ is implemented in a non-synchronized manner with the signal Vsync and the possible signal Hsync, for example in a device 1 in which this signal Vsync would not be delivered by the display 100 to the others circuits of the device 1. In such a case, the duration of the phase FAST ACQ is at least equal to the maximum duration that the period TVSYNC can have, so that in DC control mode, at least one phase DC OFF is captured during the phase FAST ACQ. Those skilled in the art will be able to adjust the disclosure hereinabove made in relation with FIGS. 1-6 to this asynchronous operation. In this asynchronous operation, determining that the control mode is the DC control mode or the pulse width modulation control mode is then implemented, from the samples, for example by calculating the shortest one among the captured durations during which the panel 102 emits no light during the phase FAST ACQ and by comparing this shortest duration with the minimum duration D of the phases PWM OFF. Further, in this asynchronous operation, detecting that the control mode is the OFF control mode (i.e., a control mode in which the panel 102 is kept switched-off during the whole duration of each period TVSYNC) can comprise detecting that the value offset between the samples having the lowest values and the samples having the highest values is less than a threshold, this threshold being determined, for example, by the minimum magnitude of the pulses PWM ON and the constant control DC ON.

In all the embodiments and alternatives previously described, according to one embodiment, determining the state of the display 100 (step 306 of FIG. 3), comprises determining the brightness emitted by the display panel 102, for example the mean brightness emitted by the panel 102 during a control period TVSYNC of the panel 102. This brightness emitted can be calculated for each channel of the sensor 106 for which the method is implemented. As an example, the brightness emitted by the panel 102 is calculated, in each channel, from the difference AMP calculated for this channel, from the detected control mode, and from the modulation duty cycle, and from the period TPWM when the detected control mode is the pulse width modulation control mode or from the duration of the phase DC OFF and from the period TVSYNC when the detected control mode is the DC control mode.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description.

The invention claimed is:

1. A method of determining a state of a display that includes a display panel and a circuit for controlling the display panel, wherein the circuit for controlling the display panel controls the display panel according to at least one control mode comprising a pulse width modulation control mode, the method comprising:

1) acquiring a plurality of samples from at least one channel of an ambient light sensor disposed below the display panel during a first acquisition phase;
2) supplying the samples to a processing circuit;
3) detecting, by the processing circuit and based on said samples, whether the display panel is controlled according to the pulse width modulation control mode; and
4) following detection of the pulse width modulation control mode, calculating by the processing circuit from said samples a duty cycle of a pulse width modulation of said pulse width modulation control mode.

2. The method according to claim 1, further comprising:

for each image displayed by the display, emitting a synchronization signal by the display and receiving the synchronization signal by a first circuit; and in step 1), triggering by the first circuit the first acquisition phase synchronously with the synchronization signal.

3. The method according to claim 2, wherein a maximum period of the synchronization signal is a known operation characteristic of the display and the duration of the first acquisition phase is shorter than this maximum period of the synchronization signal.

4. The method according to claim 2, wherein the period of the pulse width modulation control mode is a known operation characteristic of the display and determines the duration of the first acquisition phase.

5. The method according to claim 1, wherein a frequency for acquiring the samples during the first acquisition phase is at least in part determined by a maximum duty cycle of the pulse width modulation control mode and the period of the pulse width modulation, this maximum duty cycle and this period of the pulse width modulation being constant and known operation characteristics of the display.

6. The method according to claim 1, wherein step 4) comprises, following detecting the pulse width modulation control mode, determining by the first circuit and from said samples, a difference between an intensity of the light received by said at least one channel when the display panel receives a pulse and is switched-on, and an intensity of the light received by said at least one channel when the display panel is switched-off.

7. The method according to claim 1, wherein said at least one control mode further comprises a DC control mode comprising, for each control period in the DC control mode, a start-up duration during which the display panel is switched-off, the step 3) further comprising detecting, by the first circuit and based on said samples, whether the display panel is controlled according to the DC control mode, and the step 4) comprising, following detecting the DC control mode, determining by the first circuit and from said samples, a difference between an intensity of the light received by said at least one channel when the display channel is switched-on, and an intensity of the light received by said at least one channel when the display channel is switched-off.

8. The method according to claim 7, wherein in step 3), detecting the DC control mode comprises detecting by the first circuit and from said samples, the start-up duration.

9. The method according to claim 7, wherein a frequency for acquiring the samples during the first acquisition phase is at least in part determined by a maximum duty cycle of the pulse width modulation control mode and the period of the pulse width modulation, this maximum duty cycle and this period of the pulse width modulation being constant and known operation characteristics of the display, and wherein the acquisition frequency of the samples during the first acquisition phase is at least in part determined by the start-up duration.

10. The method according to claim 1, wherein said at least one control mode further comprises an OFF control mode during which the display panel is kept switched-off, and the method further comprises detecting whether the display panel is controlled according to the OFF control mode.

11. The method according to claim 10, wherein:

the method further comprises for each image displayed by the display, emitting a synchronization signal by the display and receiving the synchronization signal by a first circuit;

in step 1), triggering by the first circuit the first acquisition phase synchronously with the synchronization signal;

no synchronization signal is emitted during the OFF control mode; and detecting that the control mode of the display panel is the OFF control mode comprises detecting that no synchronization signal is emitted during a duration longer than a period of the synchronization signal.

12. The method according to claim 1, wherein the steps 1), 2), 3), and 4) are implemented for each channel of the ambient light sensor.

13. The method according to claim 1, wherein the processing circuit forms a part of the ambient light sensor.

14. The method according to claim 1, wherein the step 4) further comprises determining by the processing circuit and from said samples, a brightness level emitted by said at least one channel.

15. The method according to claim 1, wherein detecting whether the display panel is controlled according to the pulse width modulation control mode comprises:

comparing samples of said plurality of samples to a threshold;

determining, based on the comparison to the threshold, whether each sample corresponds to a phase where the display does not emit light; and determining a number of phases where the display does not emit light during the acquisition period to indicate operation of the display panel in pulse width modulation control mode.

16. The method according to claim 1, wherein detecting whether the display panel is controlled according to the pulse width modulation control mode comprises:

comparing samples of said plurality of samples to a threshold;

determining, based on the comparison to the threshold, whether each sample corresponds to a phase where the display does not emit light; and determining a duration of the phase where the display does not emit light to indicate operation of the display panel in pulse width modulation control mode.

* * * * *